United States Patent Office 2,714,576
Patented Aug. 2, 1955

2,714,576

ELECTROLYTIC PREPARATION OF 2,5-DIALK-OXY-2,5-DIHYDROFURANS

Niels Konrad Friedrich Wilhelm Clauson-Kaas, Klampenborg, and Franz Limborg, Copenhagen, Denmark, assignors, by mesne assignments, to Sadolin and Holmblad A/S, a corporation of the Kingdom of Denmark No Drawing. Application April 23, 1953,
Serial No. 350,767

Claims priority, application Denmark December 29, 1949

8 Claims. (Cl. 204—78)

This invention relates to 2,5-alkoxy-2,5-dihydrofurans having the general formula:

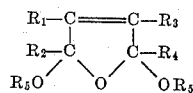

where $R_1$, $R_2$, $R_3$ and $R_4$ are hydrogen, or simple aliphatic groups, each containing less than 5 carbon atoms, and $R_5$ is an alkyl group or a substituted alkyl group.

The invention further relates to the production of said 2,5-alkoxy-2,5-dihydrofurans.

This application is a continuation-in-part of co-pending application, Serial No. 163,801, filed May 23, 1950, now abandoned.

It is known that in some cases compounds of the above kind can be produced by treating furans with halogen, or compounds containing active halogen, and an alcohol in the presence of a hydrohalide-binding substance. However, the compounds produced in this manner may contain small amounts of halogen which may result in the formation of a hydrohalide, and this is disadvantageous because compounds of the kind described are as a rule unstable in the presence of an acid.

It is an object of this invention to provide for a method of producing substantially pure 2,5-alkoxy-2,5-dihydrofurans in a simpler manner and in higher yields than by hitherto known methods.

Other objects will appear from the following detailed description of the invention and the preferred method of performing it, but we wish it to be understood, that the following description should in no manner be considered limiting to the scope of this invention, since obvious modifications will be evident to those skilled in the art.

According to the present invention 2,5-alkoxy-2,5-dihydrofurans can be produced by oxidizing and 2,5-substituting furans of the general formula:

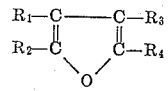

where $R_1$, $R_2$, $R_3$ and $R_4$ have the above significance, when the oxidation is carried out electrolytically in a solution of the furan in a solvent consisting of or containing an alcohol of the general formula $R_5OH$, where $R_5$ has the above significance. This method is much simpler, and the yield is better than in the known methods.

Throughout the specification with appending claims, the term "simple aliphatic groups" should be understood as including alkyl, substituted alkyl, hydroxyalkyl, acyl-oxyalkyl, formyl, acetalized formyl and carboalkoxy groups. In the following table a number of examples of the combinations of substituents are given, but many other combinations of these and other substituents will be obvious to those skilled in the art.

TABLE OF SUBSTITUENTS

| $R_1$ | $R_2$ | $R_3$ | $R_4$ | $R_5$ |
|---|---|---|---|---|
| —H | —H | —H | —H | —CH$_3$ |
| —H | —H | —H | —H | —C$_2$H$_5$ |
| —H | —H | —H | —H | CH$_3$CH$_2$CH$_2$— |
| —H | —H | —H | —H | CH$_3$CHCH$_3$ |
| —H | —H | —H | —CH$_3$ | —CH$_3$ |
| —H | —H | —H | —CH$_2$OH | —CH$_3$ |
| —H | —H | —H | —CH$_2$OOCCH$_3$ | —CH$_3$ |
| —H | —H | —H | —CH(OCH$_3$)$_2$ | —CH$_3$ |
| —H | —H | —H | —COOCH$_3$ | —CH$_3$ |
| —H | —H | —H | —CH$_2$OCH$_3$ | —CH$_3$ |
| —H | CH$_3$CHCH$_3$ | —H | —CH(OCH$_3$)$_2$ | —CH$_3$ |
| —H | —H | CH$_3$CHCH$_3$ | —H | —CH$_3$ |
| —H | CH$_3$CHCH$_3$ | —H | —COOCH$_3$ | —CH$_3$ |
| —H | —H | —H | —CH$_2$NHCOCH$_3$ | —CH$_3$ |
| —H | —H | —H | —CH(CN)OOCCH$_3$ | —CH$_3$ |
| —H | —H | —H | —CH$_2$NHCOOCH$_3$ | —CH$_3$ |
| —H | —H | —H | —CHO | —CH$_3$ |

According to one manner of carrying out the present method the oxidation takes place by means of electrolytically produced halogen, and it appears surprisingly that thereby halogen-free products may be obtained. The electrolyte may in this case be an inorganic halogen salt as ammonium bromide or lithium bromide, or an organic halogen salt as morpholine hydrobromide.

In another manner of carrying out the invention, other electrolytes may be used, such as sulphuric acid, boron trifluoride ethyl etherate, nitrates, thiocyanates or formates.

The alcohols used are preferably lower aliphatic alcohols with not more than 5 carbon atoms in the molecule.

The electrical conditions for carrying out the electrolysis are those usually applied within the art and will offer no problems to the skilled worker. Of course, the potential should be sufficiently high for producing the oxidizing agent in question. Generally a terminal voltage of about 6 volts will be sufficient.

For example, we have used as anode a 120 cm² silver plate electroplated with rhodium placed at 4 mm. distance between two nickel plates of equal area as cathodes. The electrolysis was performed on a solution containing ammonium bromide, methanol and furfuryl acetate with a terminal voltage of about 7 volts and a current of about 2 to 3 amperes during some 30 hours at —15 to —17° C., resulting in a 79% yield of 2,5-dimethoxy-2,5-dihydrofurfuryl acetate.

Starting with furan and methanol and using ammonium bromide as the electrolyte, the oxidation process may be summed up in the following equation:

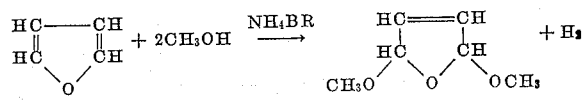

The hydrogen forms bubbles at the cathode and assists in circulating the solution, whereby the halogen formed at the anode immedately reacts with nontransformed furan.

The electrolysis is suitably carried out in cooled solutions, for example at $-10°$ to $-15°$ C. This reduces the loss of halogen, such as bromine, in secondary reactions as proved by an increased yield of the substituted dihydrofuran and reduced loss of the halogen compound, such as ammonium bromide. The electrolysis may, however, also be carried out at higher temperatures.

A further advantage of the present method is that it is not generally necessary to use dehydrated raw materials, even if a water content in the final product is unwanted, because it may lead to hydrolysis. As a matter of fact the presence of small quantities of water during the electrolysis is generally of no account. Therefore, a technical quality of the raw materials may be used, whereby the economy of the process is improved.

The dihydrofuran prepared by the electrolysis is won by neutralization of the electrolyzed mixture followed by distillation. If fractionary distillation is used, the dihydrofuran derivative is won in a very pure condition. Calculated on the furan the yield is about 75–85% of the theoretical yield, and the current efficiency is about 90%.

The compounds won by the present method are very reactive and form important intermediaries in the production of compounds which hitherto have been difficult or not at all accessible for industrial use, for example in the production of pyridazine derivatives by hydrolysis and reaction with hydrazin. Further the compounds produced by the present method may be used as solvents and as intermediaries in the manufacture of plastics.

In the following the invention will be illustrated by some examples.

*Example 1*

PRODUCTION OF 2,5-DIMETHOXY-2,5-DIHYDROFURAN 5 g. of ammonium bromide are dissolved in 220 ml. of methanol (5.5 moles) and mixed with 75 g. of freshly distilled furan (1.1 moles). The mixture is poured into an electrolysis cell which is placed in a cooling bath (temperature about $-18°$ C.). When the mixture is cooled, the electrolysis is performed with a 6 volts storage battery as the source of current. After 20.4 hours, 50.2 ampere hours have passed through the cell (85% of the theoretical amount), and the electrolysis is stopped. The contents of the cell is then poured into a solution of sodium methoxide (1.2 g. of sodium in 20 ml. of methanol), and the mixture is distilled at ordinary pressure until 150 ml. methanol containing ammonia and the surplus of furan are removed. The residue consists of a clear yellowish-brown liquid and a precipitate of sodium bromide which is filtered off (5.22 g.=99%). Then the filtrate is distilled, giving 110.2 g. of crude dimethoxydihydrofuran distilling between 159 and 188° C. Based on the furan the yield is 77% and the current efficiency is 91%.

The fractional distillation of 100 g. of crude dimethoxydihydrofuran gives 88.8 g. of analytically pure dimethoxydihydrofuran with boiling point 157–159° C.

The raw materials are of the usual technical quality.

*Example 2*

PRODUCTION OF 2,5-DIMETHOXY-2,5-DIHYDROFURFURYL ALCOHOL 5 g. of ammonium bromide are dissolved in 225 ml. of methanol (5.6 moles), and 68.6 g. of freshly distilled furfuryl alcohol (0.7 mole) are added. The mixture is electrolyzed under the conditions described in Example 1, the electrolysis being stopped when 33 ampere hours have passed through the cell (88% of the theoretical amount). The almost colourless mixture is then poured into a solution of sodium methoxide (1.2 g. of sodium in 20 ml. of methanol) and 180 ml. of methanol containing ammonia are distilled off. The rest of the methanol is removed by distillation in vacuum on the water bath, and the black oily residue is filtered, whereby 3.7 g. of sodium bromide are removed (70% of the theoretical amount). The filtrate is distilled in vacuum at a pressure of about 11 mm. of mercury, and two fractions are collected, of which one, boiling between 87 and 107° C., amounts to 63.3 g. and shows negative Beilstein-test for halogen, whereas the other, boiling between 107 and 113° C., amounts to 24.3 g. and shows positive Beilstein-test for halogen. The two fractions are mixed and 80 g. of the mixture distilled in vacuum at a pressure of 60–66 mm. of mercury. Hereby a fraction is collected, consisting of 66 g. of analytically pure dimethoxydihydrofurfuryl alcohol showing a negative Beilstein-test for halogen. The yield is 65% of the theoretical, calculated from the furfuryl alcohol, and the current efficiency is 75%.

The raw materials are the usual technical products.

*Example 3*

PREPARATION OF 2,5-DIMETHOXY-2,5-DIHYDROSYLVANE 5 g. of ammonium bromide are dissolved in 240 ml. of methanol (5 moles) and 57.4 g. of freshly distilled sylvane (0.7 mole). The mixture is electrolyzed as described in Example 1, the electrolysis being stopped when 31.9 ampere hours (85% of the theoretical amount) have passed through the cell. The colourless reaction products are poured into a solution of sodium methoxide (1.2 g. of sodium in 20 ml. of methanol), and 200–210 ml. of methanol, containing ammonia and the excess of sylvane, are distilled off at ordinary pressure. The residue consists of a dark reddish-brown liquid with a precipitate of sodium bromide, which is filtered off (4.97 g.=95%). The filtrate is then distilled at a pressure of 102 mm. of mercury, and a fraction is collected, consisting of pure 2,5-dimethoxy-2,5-dihydrosylvane. The yield is 65.1 g. which is 65% of the theoretical amount, calculated from the sylvane, and the current efficiency is 76%. The raw materials are the usual technical products.

*Example 4*

PREPARATION OF 2,5-DI-ISO-PROPOXY-2,5-DIHYDROFURAN 2.5 g. of ammonium bromide are dissolved in 250 ml. of iso-propanol (3.3 moles) and mixed with 47.6 g. of furan (0.7 mole). The mixture is electrolyzed as described in Example 1, the electrolysis being stopped when 12.1 ampere hours (32% of the theoretical amount) have passed through the cell. The tea-coloured reaction products are poured into a solution of sodium iso-propoxide (0.4 g. of sodium in 20 ml. of iso-propanol), and 230 ml. of iso-propanol, containing ammonia and the excess of furan are distilled off. The residue consists of an almost black liquid which is filtered and distilled in vacuum. The main fraction distills at 74–76° C. at 9 mm. of mercury. The yield is 30.3 g. of 2,5-di-iso-propoxy-2,5-dihydrofuran and the current efficiency 72%. The Beilstein-test for halogen is negative.

The raw materials used are of the usual technical quality.

Example 5

PREPARATION OF 2,5-DI-N-PROPOXY-2,5-DIHYDROFURAN 8 ml. of acetyl bromide are reacted with 250 ml. of n-propanol. Then 10–15 g. of diethanolamine are added drop by drop, until a wet piece of test paper shows pH=7 when dipped into the mixture. 51 ml. of furan (0.7 mole) are added and the solution electrolyzed as described in Example 1. After 17.8 ampere hours (47% of the theoretical amount) have passed through the cell, the electrolysis is stopped. The slightly yellow reaction products are distilled at a pressure of 200 mm. of mercury, whereby 212 ml. of n-propanol are collected, containing the excess of furan. The almost black residue consists of an oil (diethanolamine hydrobromide) which sticks to the walls of the flask and a more easy-flowing liquid, which is decanted off and distilled at a pressure of 12 mm. of mercury. The main fraction distills at 93–97° C. yielding 41.3 g. of 2,5-di-n-propoxy-2,5-dihydrofuran which corresponds to a current efficiency of 74%. The Beilstein-test for halogen is positive.

The raw materials are of the usual technical quality.

Example 6

PREPARATION OF 2,5-DIMETHOXY-2,5-DIHYDROFURFURYLMETHYL ETHER 5 g. of ammonium bromide are dissolved in 280 ml. of methanol and 11.4 g. of freshly distilled furfuryl-methyl-ether (boiling point at 760 mm. of mercury: 131–137° C.) are added and the mixture electrolyzed as described in Example 1. After 4.6 ampere hours (85% of the theoretical amount) have passed through the cell, the almost colourless reaction products are treated as described in the preceding examples. A vacuum distillation of the final product at 11 mm. of mercury yields 10.3 g. of 2,5-dimethoxy-2,5-dihydrofurfurylmethyl ether, the current efficiency being 70%. The Beilstein-test for halogen is negative.

The raw materials are of the usual technical quality.

2,5-dimethoxy-2,5-dihydrofurfurylmethyl ether is a hitherto unknown compound, the boiling point of which is 82–85° C. at 11 mm. of mercury, and $n_D^{25}=1.4398$.

Example 7

PREPARATION OF 2,5-DIMETHOXY-2,5-DIHYDROFURAN 1 g. of concentrated sulphuric acid is dissolved in 220 ml. of methanol and 75 g. of furan, and the mixture is electrolyzed as described in Example 1. When 31.6 ampere hours (54% of the theoretical amount) have passed through the cell, the electrolysis is stopped. The dark brown reaction products are poured into a solution of sodium methoxide (1.30 g. of sodium in 25 ml. of methanol), and the methanol is distilled off at atmospheric pressure. The residue is distilled in vacuum, and 55 g. of a product is collected, distilling between 54 and 149° C. About 10–20 g. of a black residue remains. The distillate is subjected to fractional distillation at a pressure of 20 mm. of mercury, and at about 64° C. there is recovered 31.7 g. of 2,5-dimethoxy-2,5-dihydrofuran, which corresponds to a current efficiency of 41%.

Example 8

To a solution of 5 g. of ammonium bromide in 260 ml. of methanol, 42 g. of furfuryl acetate are added. The mixture is cooled to about −15° C. and electrolyzed, using a potential across the cell of about 5 volts, the electrolysis being continued until 16.3 ampere hours have passed the solution. Then the electrolysis is stopped, and the still cold reaction mixture is poured into a solution of sodium methoxide (1.20 g. of sodium in 30 ml. of methanol), whereby the colour of the solution is changed from light yellow to pale brown. After evaporation of methanol and ammonia in vacuum, on addition of 200 ml. of ether sodium bromide is precipitated from the distillation residue and then removed by filtration. After evaporation of ether, the filtrate is distilled in vacuum. The residue, consisting of a mixture of 2,5-dimethoxy-2,5-dihydrofurfuryl acetate and 2,5-dimethoxy-2,5-dihydrofurfuryl alcohol, is treated with acetic anhydride in pyridine, whereby the alcohol is acetylated. By distillation in vacuum, 52.6 g. of 2,5-dimethoxy-2,5-dihydrofurfuryl acetate are recovered with boiling point at about 117–119° C. under 12 mm. of mercury.

Example 9

35.5 g. of furfural dimethylacetal, 270 ml. of methanol and 5.0 g. of ammonium bromide are electrolyzed as described in Example 8, passing 14.0 ampere hours through the solution. The working-up of the electrolysate yields 41.8 g. of 2,5-dimethoxy-2,5-dihydrofurfural dimethylacetal, boiling at 107–110° C. under 13 mm.

Example 10

12.6 g. of 4-isopropyl-2-furoic acid methyl ester, 280 ml. of methanol and 1.87 g. of concentrated sulphuric acid are electrolyzed as described in Example 8, passing 5.2 ampere hours through the solution. By the working-up of the electrolysate, 10.5 g. of 2,5-dimethoxy-4-isopropyl-2,5-dihydro-2-furoic acid methyl ester are obtained, boiling at 69–71° C. under 0.1 mm.

Example 11

14.7 g. of 4-isopropyl-2-furfural dimethylacetal, 270 ml. of methanol and 5.0 g. of ammonium bromide are electrolyzed as described in Example 8, passing 4.4 ampere hours through the solution. The working-up yields 14.7 g. of 2,5-dimethoxy-4-isopropyl-2,5-dihydro-2-furfural dimethylacetal, boiling at 64–65.5 C. until 0.1 mm.

Example 12

16.5 g. of furfural cyanohydrin acetate, 250 ml. of methanol and 5.0 g. of ammonium bromide are electrolyzed as described in Example 8, passing 10.7 ampere hours through the solution. The electrolysate yields after re-distillation 5.2 g. of 2,5-dimethoxy-2,5-dihydro-2-furfural cyanohydrin acetate, boiling at 101–102° C. under 0.2 mm., and having a refractive index $n_D^{25}$ of 1.4549.

Example 13

41.7 g. of 2-acetamidomethylfuran, 260 ml. of methanol and 5.0 g. of ammonium bromide are electrolyzed as described in Example 8, passing 17.7 ampere hours through the solution. The working-up of the electrolysate yields 57.8 g. of 2,5-dimethoxy-2,5-dihydro-2-acetamidomethylfuran, boiling at 119–134° C. under 0.6 mm.

Example 14

22.0 g. of β-isopropylfuran, 275 ml. of methanol and 5.0 g. of ammonium bromide are electrolyzed as described in Example 8, passing 10.2 ampere hours through the solution. The working-up yields 24.8 g. of 2,5-dimethoxy-3-isopropyl-2,5-dihydrofuran boiling at 83 to 86° C. under 15 mm.

Example 15

63.0 g. of methyl furoate, 230 ml. of methanol and 1.0 ml. of concentrated sulphuric acid are electrolyzed as described in Example 8, passing 33.5 ampere hours through the solution. The working-up yields 63.7 g. of 2,5-dimethoxy-2,5-dihydrofuroic acid methyl ester, boiling at 119–121° C. under 13 mm.

Example 16

31.0 g. of methylfurfuryl carbamate, 270 ml. of methanol and 5.0 g. of ammonium bromide are electrolyzed as described in Example 8, passing 11.9 ampere hours through the solution. The working-up of the electrolysate yields 38.7 g. of methyl-2,5-dimethoxy-2,5-dihydrofurfuryl carbamate as a colourless liquid boiling at 100–107° C. under 0.2 mm.

The starting material, methylfurfuryl carbamate, is a hitherto unknown compound, which may be prepared in the following manner: 50.0 g. of methyl chloro-formate are reacted with 48.5 g. of furfurylamine in 200 ml. of pyridine and 300 ml. of benzene, yielding 53.1 g. of methylfurfuryl carbamate, which is a colourless liquid boiling at 118–119° C. under 10 mm.

Example 17

30.0 g. of furfural, 250 ml. of methanol and 5.0 g. of boron trifluoride ethyl etherate are electrolyzed as described in Example 8, passing 20.0 ampere hours through the solution. The working-up of the electrolysate yields 47.1 g. of a product boiling at 94–110° C. under 10 mm., and consisting mainly of 2,5-dimethoxy-2,5-dihydrofurfural dimethylacetal (containing some 2,5-dimethoxy-2,5-dihydrofurfural).

Example 18

5 g. of sodium nitrate are dissolved in 270 ml. of methanol and 20 ml. of furan are added, whereafter the solution is cooled to between −10 and −20° C. and electrolyzed with a potential of about 5 volts over the cell, 13.4 ampere hours being passed through the solution. On working-up the electrolysate as described in Example 1, the yield is 14.0 g. of 2,5-dimethoxy - 2,5 - dihydrofuran, boiling at 49–54° C. under 10 mm. of mercury.

Example 19

5 g. of sodium formate are dissolved in 255 ml. of methanol, and 25 ml. of furan are added whereafter the solution is electrolyzed (consumption of electricity: 7.2 ampere hours) and worked-up as described in Example 1. The yield is 3.0 g. of 2,5-dimethoxy-2,5-dihydrofuran, boiling at 52–57° C. under 13 mm.

Example 20

5 g. of ammonium thiocyanate are dissolved in 250 ml. of methanol, and 25 ml. of furan are added whereafter the mixture is electrolyzed (7.8 ampere hours) and worked-up as described in Example 1. The yield is 3.5 g. of 2,5-dimethoxy-2,5-dihydrofuran, boiling at 56–57° C. under 18 mm.

Example 21

5.0 g. of ammonium nitrate are dissolved in 250 ml. of methanol, and 20 ml. of furan are added whereafter the mixture is electrolyzed (12.0 ampere hours) and worked-up as described in Example 1. The yield is 8.0 g. of 2,5-dimethoxy-2,5-dihydrofuran, boiling at 48–63° C. under 9 mm.

Example 22

5.0 ml. of boron trifluoride ethyl etherate are dissolved in 260 ml. of methanol, and 25 ml. of furan are added whereafter the mixture is electrolyzed (13.7 ampere hours) and worked up as described in Example 1. The yield is 15 g. of 2,5-dimethoxy-2,5-dihydrofuran, boiling at 51–61° C. under 12 mm.

Example 23

7 g. of lithium bromide and 1.3 g. of ammonium bromide are dissolved in 250 ml. of n-propanol, and 22 ml. of furan are added whereafter the mixture is electrolyzed (19.2 ampere hours) and worked up as described in Example 1. The yield is 34.4 g. of 2,5-di-n-propoxy-2,5-dihydrofuran, boiling at 117–124° C. under 32 mm.

Example 24

PREPARATION OF 2,5-DIETHOXY-2,5-DIHYDROFURAN 4.0 g. of ammonium bromide (0.041 mole) are dissolved in 255 ml. of anhydrous ethanol and 47.6 g. of furan (0.70 mole) and the solution electrolyzed as described in Example 1.

After electrolysis the light-brown liquid in the cell is poured into a solution of sodium methoxide (0.96 g. of sodium in 15 ml. of methanol).

On working-up as described in Example 3, 69.5 g. of 2,5-diethoxy-2,5-dihydrofuran is recovered, corresponding to 63% of the theoretical yield.

We claim:

1. Method for producing, without formation of substituted derivatives, 2,5-dialkoxy-2,5-dihydrofurans of the formula:

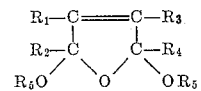

where $R_1$, $R_2$, $R_3$ and $R_4$ are from the group consisting of hydrogen and aliphatic groups of less than 5 carbon atoms, and $R_5$ is an aliphatic group of 1 to 5 carbon atoms, comprising electrolyzing at a temperature sufficiently low to permit production of said product, a solution containing a furan of the formula:

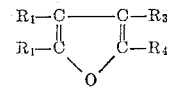

where $R_1$, $R_2$, $R_3$ and $R_4$ have the above significance, an aliphatic alcohol of 1 to 5 carbon atoms and an electrolyte soluble in the solution to be electrolyzed to produce the product free of substituted derivatives, and recovering the product.

2. Method as set forth in claim 1, in which the solution containing a furan, an alcohol and an electrolyte is cooled to −10 to −20° C. during the electrolysis.

3. Method as set forth in claim 1, in which the electrolyte is an ammonium salt.

4. Method as set forth in claim 3, in which the electrolyte is ammonium bromide.

5. Method as set forth in claim 3, in which the electrolysate is poured into a solution of sodium methoxide; liberated ammonia and alcohol is distilled off; and the dialkoxydihydrofuran is recovered by fractional distillation.

6. Method as set forth in claim 1, in which the electrolyte is a mixture of ammonium bromide and lithium bromide.

7. Method as set forth in claim 1 in which the furan is unsubstituted.

8. Method as set forth in claim 7 in which the alcohol is methanol.

References Cited in the file of this patent

UNITED STATES PATENTS

| | | |
|---|---|---|
| 2,420,954 | Isham | May 20, 1947 |
| 2,475,097 | Jones | July 5, 1949 |